United States Patent
Moldovan et al.

(10) Patent No.: US 9,212,753 B2
(45) Date of Patent: Dec. 15, 2015

(54) SLAM SHUT SAFETY DEVICE WITH GUIDED VALVE DISC

(71) Applicant: EMERSON PROCESS MANAGEMENT REGULATOR TECHNOLOGIES, INC., McKinney, TX (US)

(72) Inventors: Cristian-Tiberiu Moldovan, Cluj-Napoca (RO); Michel Bouvry, Champhol (FR); Roman Alexandru-Vlad, Cluj-Napoca (RO); Stanley D. Hall, Frisco, TX (US); David E. Woollums, Frisco, TX (US); Tung K. Nguyen, McKinney, TX (US)

(73) Assignee: EMERSON PROCESS MANAGEMENT REGULATOR TECHNOLOGIES, INC., McKinney, TX (US)

( * ) Notice: Subject to any disclaimer, the term of this patent is extended or adjusted under 35 U.S.C. 154(b) by 181 days.

(21) Appl. No.: 14/039,108

(22) Filed: Sep. 27, 2013

(65) Prior Publication Data
US 2014/0083526 A1    Mar. 27, 2014

Related U.S. Application Data

(60) Provisional application No. 61/706,198, filed on Sep. 27, 2012.

(51) Int. Cl.
*F16K 17/00* (2006.01)
*F16K 17/164* (2006.01)
(Continued)

(52) U.S. Cl.
CPC .................. *F16K 17/164* (2013.01); *F16K 1/36* (2013.01); *F16K 1/48* (2013.01); *Y10T 137/7728* (2015.04)

(58) Field of Classification Search
CPC ......... F16K 17/164; F16K 17/10; F16K 1/48; F16K 1/36; Y10T 137/7728

USPC .................. 137/456, 463, 543.21, 543.23
See application file for complete search history.

(56) References Cited

U.S. PATENT DOCUMENTS 1,696,452 A * 12/1928 Raymond ...................... 137/477
3,092,133 A *  6/1963 Clark ............................. 137/220
(Continued)

FOREIGN PATENT DOCUMENTS

FR          1 167 362 A        11/1958

OTHER PUBLICATIONS

International Search Report and Written Opinion for Application No. PCT/US2013/061790, dated Dec. 11, 2013.
(Continued)

*Primary Examiner* — Marina Tietjen
*Assistant Examiner* — Umashankar Venkatesan
(74) *Attorney, Agent, or Firm* — Marshall, Gerstein & Borun LLP

(57) ABSTRACT

A slam-shut safety device includes a valve body, a valve disc, a reset pin, and a guide collar. The valve disc is disposed within the valve body and shiftable along a slam-shut axis between an open position and a closed second position. The reset pin is operatively coupled to the valve disc and shiftable along the slam-shut axis relative to the valve body between an untripped position placing the valve disc in the open position and a tripped position placing the valve disc in the closed position. The guide collar includes a hollow cylindrical portion extending away from the valve disc at least partly over the reset pin and being slidably disposed in a guide bore of a slam shut body that is connected to the valve body and supporting the reset pin, thereby providing added structural integrity to the rest pin and valve disc.

20 Claims, 5 Drawing Sheets

(51) Int. Cl.
*F16K 1/36* (2006.01)
*F16K 1/48* (2006.01)

(56) References Cited

U.S. PATENT DOCUMENTS

| | | | | |
|---|---|---|---|---|
| 3,211,174 A | * | 10/1965 | Weise et al. | 137/469 |
| 3,595,263 A | * | 7/1971 | Greenlaw | 137/451 |
| 3,722,860 A | * | 3/1973 | Curran | 251/332 |
| 3,765,447 A | * | 10/1973 | Cornell | 137/538 |
| 3,913,885 A | * | 10/1975 | Greenwood et al. | 251/63 |
| 4,295,489 A | * | 10/1981 | Arends et al. | 137/488 |
| 4,421,298 A | | 12/1983 | Kujawski | |
| 4,462,420 A | * | 7/1984 | Cullie | 137/488 |
| 5,082,239 A | * | 1/1992 | Feild | 251/120 |
| 6,318,406 B1 | * | 11/2001 | Conley | 137/491 |
| 8,225,812 B2 | | 7/2012 | Faillat et al. | |
| 8,312,893 B2 | * | 11/2012 | Bey et al. | 137/625.38 |
| 2004/0089347 A1 | * | 5/2004 | Cavagna | 137/491 |
| 2011/0240128 A1 | * | 10/2011 | Barbato et al. | 137/1 |
| 2011/0284102 A1 | | 11/2011 | Schneider | |
| 2014/0166139 A1 | * | 6/2014 | Watanabe et al. | 137/625.35 |

OTHER PUBLICATIONS

International Search Report and Written Opinion for Application No. PCT/US2013/061788, dated Dec. 11, 2013.

* cited by examiner

SLAM SHUT SAFETY DEVICE WITH GUIDED VALVE DISC

CROSS-REFERENCE TO RELATED APPLICATIONS

This application claims the benefit of U.S. Provisional Application No. 61/706,198, filed Sep. 27, 2012, which is incorporated by reference herein.

FIELD OF THE DISCLOSURE

The present disclosure generally relates to fluid control components for gas distribution systems and, more particularly, to slam-shut safety devices for gas distribution systems.

BACKGROUND

Gas distribution systems, such as systems used to distribute natural gas, typically transport gas from a producer to a consumer along a series of pipes and through a series of valves. Each gas distribution system may include one or more regulator valves that control the pressure of the gas within the distribution system. Normally, the gas is transmitted at a high pressure through the system. However, the pressure of the gas must be reduced prior to final distribution to the consumers. This pressure reduction is typically accomplished at pressure reducing stations within local networks.

Typically, these pressure reducing stations include one or more pressure regulating valves and some sort of safety device to shut off the flow of gas should the pressure regulating valve fail. Most commonly, slam-shut safety valves are used for this purpose. For example, U.S. Pat. No. 4,134,421, which is hereby incorporated by reference, discloses a slam-shut safety valve that provides overpressure protection in a pipeline. Another example of a slam-shut safety valve is disclosed in U.S. Pat. No. 8,225,812, which also is incorporated by reference herein. The slam-shut safety valve is generally disposed upstream of the pressure regulating valve so that the slam-shut valve may prevent gas from reaching the pressure regulating valve in the event of the pressure regulating valve has failed. The slam-shut safety valve monitors gas pressure downstream of the pressure regulating valve for maximum and minimum pressure tolerances. If the downstream pressure exceeds either the maximum or minimum tolerance, the slam-shut safety valve closes, cutting off the flow of gas to the pressure regulating valve and preventing an uncontrolled leak of gas due to the pressure regulating valve failure.

Known slam-shut safety valves have a valve disc that covers a valve orifice in the vicinity of a valve seat when an overpressure or underpressure condition is sensed. The valve disc is coupled to a reset pin, and the reset pin in turn is attached to an actuator that senses the overpressure or underpressure condition. The reset pin is typically in the open or untripped position, which places the valve disc away from the valve seat in an open position. Should the actuator sense the appropriate trip condition, the actuator releases the reset pin, and the valve disc shifts to the closed position against the valve seat.

In conventional slam-shut devices, the reset pin is exposed to the flow of fluid. Moreover, in certain flow conditions, such as relatively high flow conditions, forces generated by the fluid flow can impact the proper operation of the reset pin, as well as even deform (e.g., bend) the reset pin.

SUMMARY

One aspect of the present disclosure provides a slam-shut safety device including a valve body, a valve disc, a rest pin, and a guide collar. The valve body has an inlet, an outlet, and defines a flow path extending between the inlet and the outlet. The valve body also includes a valve seat surrounding an orifice disposed between the inlet and the outlet. The valve disc is disposed within the valve body and shiftable along a slam-shut axis between an open first position in which the valve disc is spaced away from the valve seat, and a closed second position in which the valve disc is seated against the valve seat. The reset pin is operatively coupled to the valve disc and shiftable along the slam-shut axis relative to the valve body between an untripped position placing the valve disc in the open first position and a tripped position placing the valve disc in the closed second position. The reset pin is arranged to respond to an actuator to shift the reset pin from the untripped position toward the tripped position. The guide collar is connected to the valve disc and includes a hollow cylindrical portion extending away from the valve disc at least partly over the reset pin. The guide collar is also slidably disposed in a guide bore of a slam shut body that is connected to the valve body and supporting the reset pin, thereby providing added structural integrity to the rest pin and valve disc.

Another aspect of the present disclosure provides a slam-shut safety device including a slam shut body, a reset pin, a valve disc, and a guide collar. The slam shut body includes a throat portion adapted to be connected to a valve body. The reset pin is supported by the slam-shut body and extend out of the throat portion. The reset pin is shiftable along a slam-shut axis between an untripped position retracted into the slam-shut body and a tripped position extended out of the slam-shut body relative to the retracted position. The reset pin is arranged to respond to an actuator to shift the reset pin from the untripped position toward the tripped position. The valve disc is operatively coupled to an end of the reset pin outside of the throat of the slam-shut body and is adapted to be disposed within the valve body when the slam-shut body is connected to the valve body. The valve disc is shiftable along the slam-shut axis between an open first position when the reset pin is in the untripped position, and a closed second position when the reset pin is in the tripped position. The guide collar is connected to the valve disc and includes a hollow cylindrical portion extending away from the valve disc at least partly over the reset pin. The guide collar is also slidably disposed in a guide bore of the slam shut body, such that the guide collar is shiftable along the slam-shut axis between a retracted position, wherein a majority of the guide collar is disposed inside of the guide bore when the valve disc is in the open position, and an extended position, wherein the majority of the guide collar is disposed outside of the guide bore when the valve disc is in the closed position.

Yet another aspect of the present disclosure provides a slam-shut safety device including a valve body having an inlet, an outlet, and defining a flow path extending between the inlet and the outlet. The valve body includes a valve seat surrounding an orifice disposed between the inlet and the outlet. The device further includes a valve disc disposed within the valve body and shiftable along a slam-shut axis between an open first position in which the valve disc is spaced away from the valve seat, and a closed second position in which the valve disc is seated against the valve seat. The device further includes a reset pin operatively coupled to the valve disc and shiftable along the slam-shut axis relative to the valve body between an untripped position placing the valve disc in the open first position and a tripped position placing the valve disc in the closed second position. The reset pin is also arranged to respond to an actuator to shift the reset pin from the untripped position toward the tripped position. The device still further includes a means coupled to the valve disc for protecting the reset pin against detrimental effects of fluid forces generated in the valve body adjacent to the valve disc.

DETAILED DESCRIPTION

Figure 1:
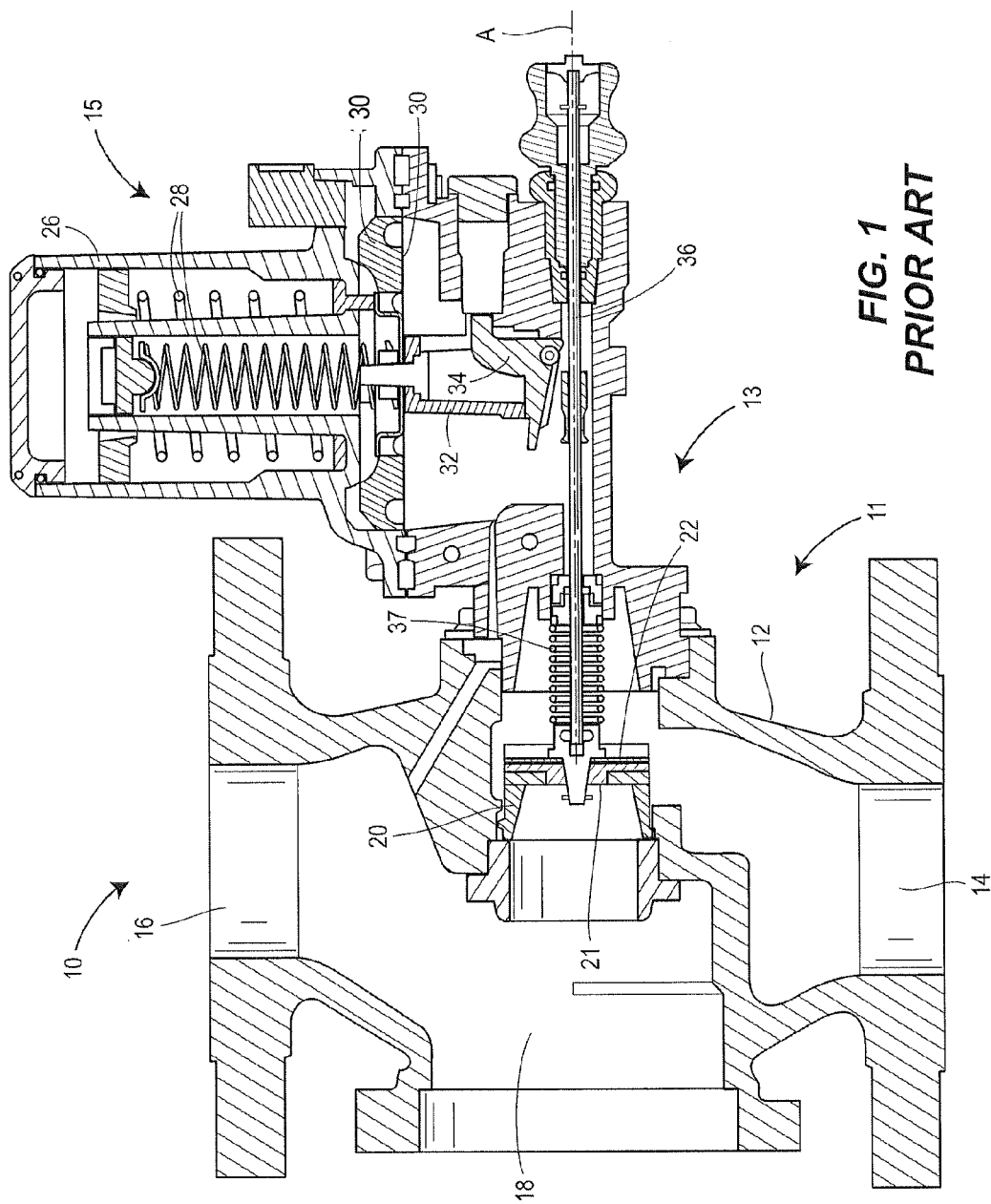
FIG. 1 is a cross-sectional view of a prior art slam-shut safety valve and showing the valve disc in a closed position.
Figure 2:
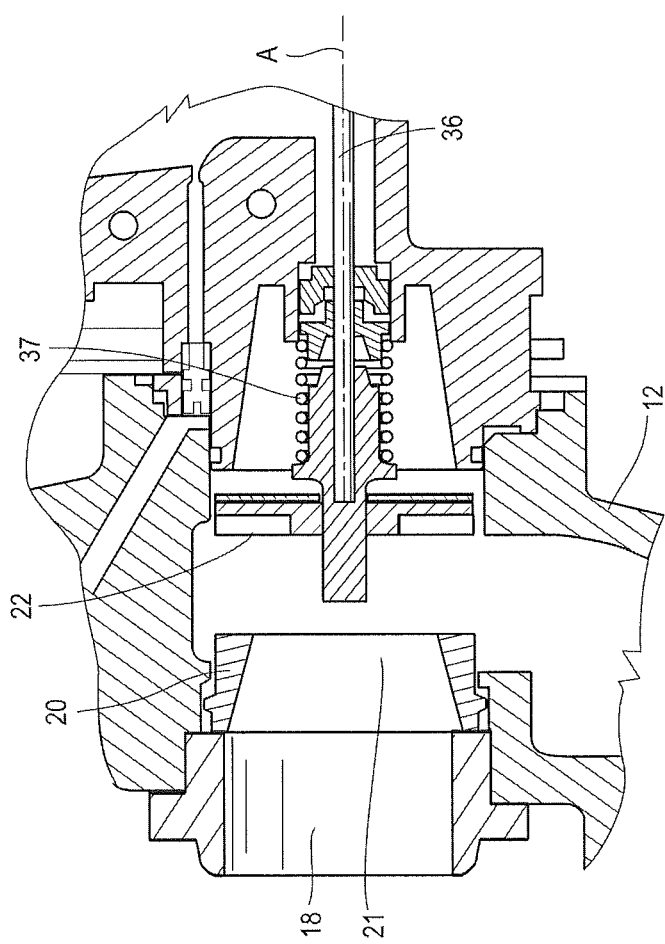
FIG. 2 is an enlarged cutaway view of the slam-shut safety valve of FIG. 1, showing the valve disc in an open position.

Turning now to the drawings, FIGS. 1 and 2 illustrate one example of a known slam-shut safety device 10. The slam-shut safety device 10 may be attached to a main regulator (not shown) in a gas distribution system to provide a safety shutoff capability in the event of main regulator failure. The slam-shut safety device 10 includes a valve portion 11, a slam-shut portion 13, and an actuator 15. The valve portion 11 includes a valve body 12 having a fluid inlet 14, and a fluid outlet 16 connected by a fluid passage forming a flow path 18. A valve seat 20 is disposed within the valve body 12 and defines a flow orifice 21 forming a portion of the flow path 18. Consequently, fluid flowing through the slam-shut safety device 10 flows from the fluid inlet 14, through the flow path 18 including the valve seat 20 (and the flow orifice 21 formed by the valve seat 20) to the fluid outlet 16.

The slam-shut portion 13 includes a valve disc 22 that cooperates with the valve seat 20 to restrict fluid flow through the valve body 12 when an overpressure or underpressure condition is sensed downstream of the main regulator. The valve disc 22 slides within the valve body 12 toward the valve seat 20 in order to close the fluid orifice 21, and away from the valve seat 20 in order to open the fluid orifice 21. Typically, the actuator 15 includes a housing 26 enclosing one or more springs 28, and the springs 28 are typically connected to a diaphragm 30. The diaphragm 30 is sensitive to pressure changes within the actuator 15 and moves within the actuator housing 26 in response to pressure changes. The diaphragm 30 is connected to a back plate 32, which moves longitudinally within the housing 26 in conjunction with the diaphragm 30. The back plate 32 interacts with a cam 34 to engage or release a reset pin 36. The reset pin 36 is shiftable along a slam-shut axis A relative to the valve body 12 between a retracted or untripped position in which the valve disc 22 is spaced away from the valve seat 20 in an open position opening the flow orifice 21, and an extended or tripped position in which the valve disc 22 is seated against the valve seat 20 in a closed position closing the flow orifice 21.

The slam-shut portion includes a spring 37 or other suitable biasing mechanism, which acts to bias the valve disc 22 toward the closed position. Consequently, the reset pin 36 is shiftable between the untripped position and the tripped position when the actuator 15 senses either an overpressure condition or an underpressure condition. The actuator 15 causes the cam 34 to release the reset pin 36, such that the spring 37 causes the reset pin 36 and hence the valve disc 22 to slide toward the valve seat 20, ultimately bringing the valve disc 22 into contact with the valve seat 20, thus closing the flow orifice 21 and shutting off fluid flow through the flow path 18 in the valve body 12.

FIG. 2 illustrates a close up view of the slam-shut portion 13 of the slam-shut safety device 10. The reset pin 36 is shown connected to the valve disc 22, with the reset pin 36 disposed in the untripped position placing the valve disc 22 in the open position spaced away from the valve seat 20. The reset pin 36, when positioned in the untripped position, may be held in place by the cam 34 or other suitable latching mechanism, such that the cam 34 releasably holds the reset pin 36 in the untripped position (which can also be referred to as the armed position) with the valve disc 22 is spaced away from the valve seat 20. When the cam 34 is activated by the actuator 15, the cam 34 releases the reset pin 36, and the valve disc 22 slides or otherwise shifts toward the valve seat 20 to close the slam-shut safety device 10, preventing fluid flow through the flow path 18 of the valve body 12.

Figure 3:
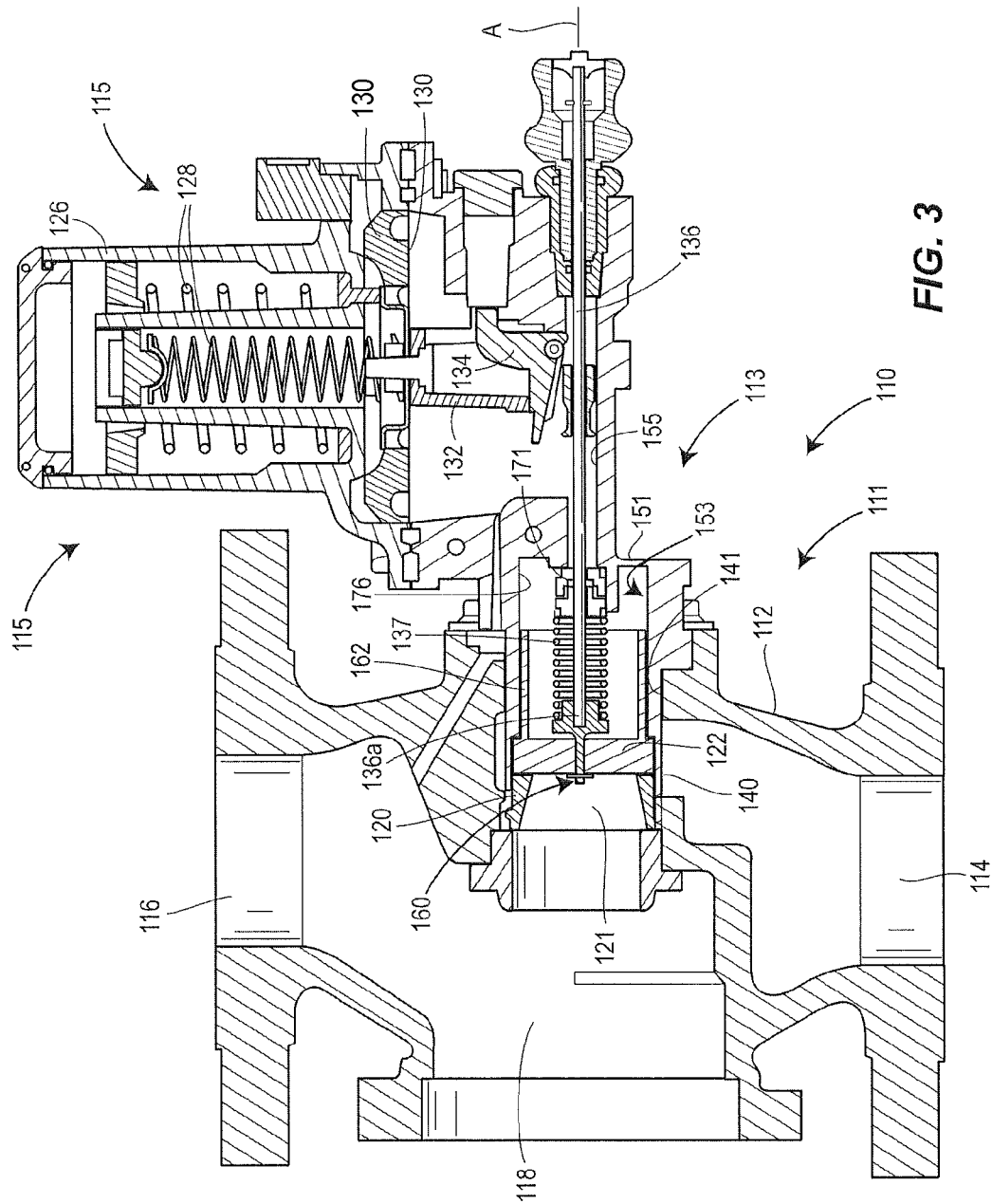
FIG. 3 is a cross-sectional side view of a slam-shut safety valve constructed in accordance with the teachings of the present disclosure, incorporating a guided valve disc.
Figure 4:
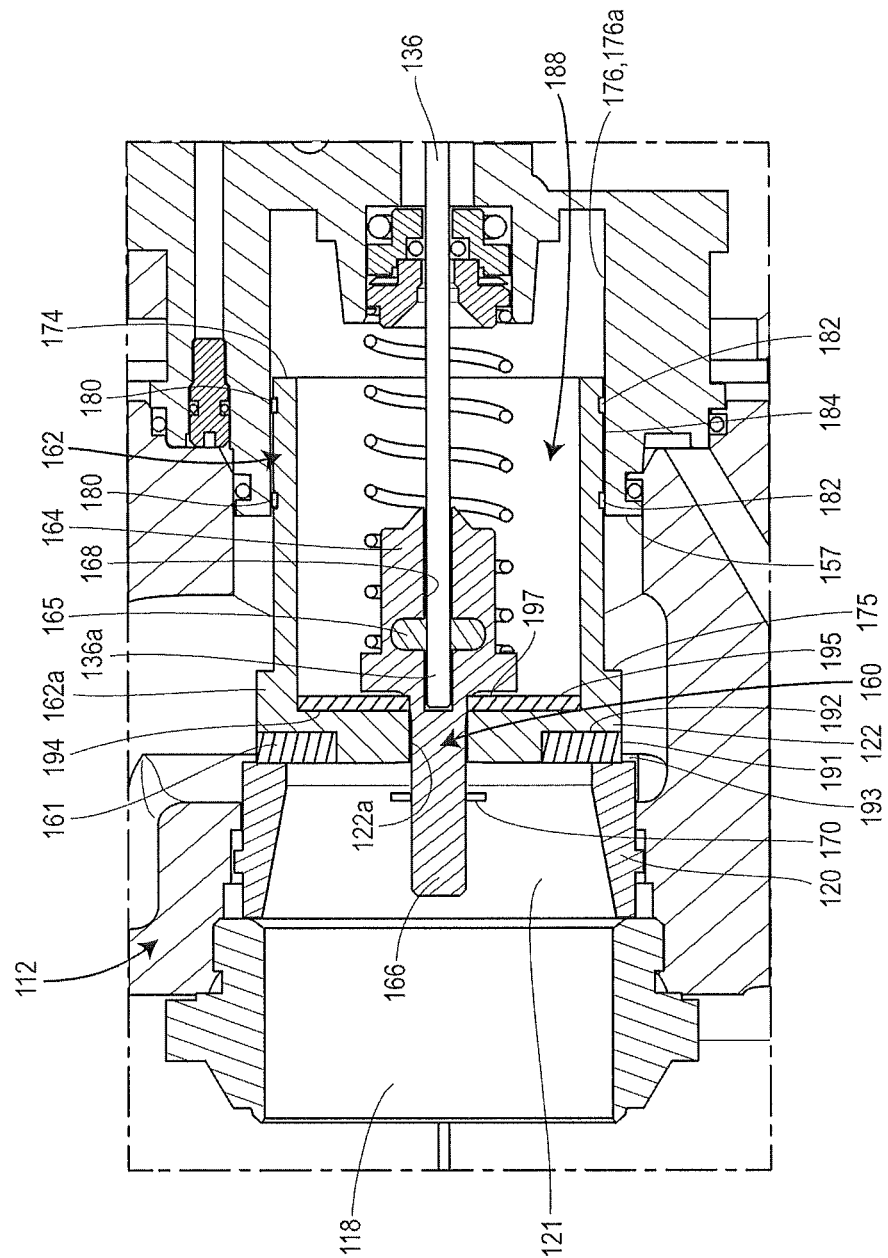
FIG. 4 is an enlarged cutaway view of the slam-shut safety valve of FIG. 3, showing the valve disc in a closed position.
Figure 5:
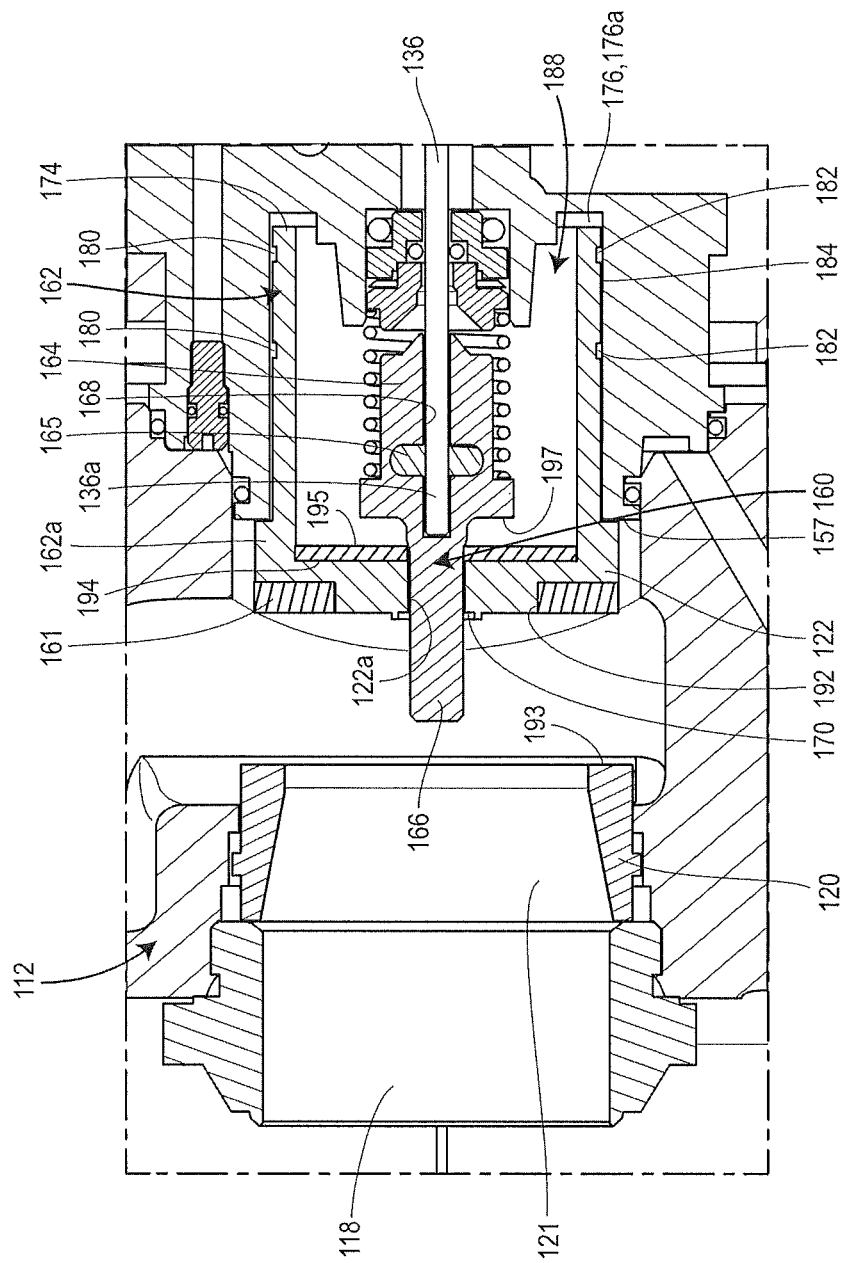
FIG. 5 is an enlarged cutaway view of the slam-shut safety valve of FIG. 3, showing the valve disc in an open position.

Referring now to FIGS. 3-5, a slam-shut safety device 110 assembled in accordance with the teachings of the present disclosure is shown. The slam-shut safety device 110 may be similar to the slam-shut safety device 10 discussed above with respect to FIGS. 1 and 2, and therefore, the same or similar components will have the same reference numerals, although the reference numerals will be increased by 100. Once again, the slam-shut safety device 110 may be attached to a main regulator (not shown) in a gas distribution system to provide a safety shutoff capability in the event of main regulator failure. As shown in FIG. 3, the slam-shut safety device 110 can include a slam-shut portion 113 and an actuator 115, adapted to be connected to a valve portion 111. The valve portion 111 includes a valve body 112 having a fluid inlet 114 and a fluid outlet 116, with the inlet 114 and the outlet 116 being connected by a fluid passage forming a flow path 118. As shown in FIGS. 3-5, a valve seat 120 is disposed within the valve body 112 and defines a flow orifice 121 forming a portion of the flow path 118. Consequently, fluid flowing through the valve portion 111 flows from the fluid inlet 114, through the flow path 118 including the valve seat 120 (and the flow orifice 121 formed by the valve seat 120) to the fluid outlet 116.

In the version depicted in FIG. 3, the slam-shut safety device 110 includes a cage 140 mounted within a throat portion 141 of the valve body 112 for receiving a valve disc 122 of the slam-shut portion 113. Other versions, however, do not include the cage 140, similar to that depicted in FIGS. 4 and 5.

The slam-shut portion 113 in FIGS. 3-5 includes a slam-shut body 151 and a reset pin 136 slidably disposed in a reset bore 155 of the slam-shut body 151. As shown, the reset pin 136 and reset bore 155 are disposed on a common slam-shut axis A (shown in FIG. 3). The slam-shut body 151 further defines a throat portion 153 disposed between the reset bore 155 and the throat portion 141 of the valve body 112. The throat portion 153 of the slam-shut body 151 is connected to the throat portion 141 of the valve body 112. The valve disc 122, which as with the example depicted in FIGS. 1 and 2, cooperates with the valve seat 120 to restrict fluid flow through the slam-shut safety device 110 when an overpressure or underpressure condition is sensed downstream of the main regulator. The valve disc 122 is operably connected to an end 136a of the reset pin 136 such that it shifts along the slam-shut axis A toward the valve seat 120 in order to close the fluid orifice 121 in reaction to actuation of the actuator 115, and further shifts along the slam-shut axis A away from the valve seat 20 in order to open the fluid orifice 121 in reaction to manipulation of the reset pin 136 in a known manner.

With reference to FIGS. 4 and 5, the present version of the slam-shut safety device 110 includes a plug support 160 operably connecting the valve disc 122 to the end 136a of the reset pin 136. The plug support 160 includes a body portion 164 and a nose portion 166 extending away from the body portion 164. The body portion 164 includes a generally cylindrical form defining a blind bore 168 receiving and connected to the end 136a of the reset pin 136. A clip 165 can also be included to connect the plug support 160 to the reset pin 136 in a known manner. The nose portion 166 also includes a generally cylindrical form, but with a diameter substantially smaller than a diameter of the body portion 164. As shown, the nose portion 166 extends through a central opening 122a of the valve disc 122. In the disclosed version, a locking clip 170 is fixed to the nose portion 166 for retaining the valve disc 122 on the plug support 160 in a manner that allows the valve disc 122 to float axially a limited distance along the nose portion 166 for facilitating alignment of the valve disc 122 relative to the valve seat 120.

Referring back to FIG. 3, the actuator 115 of the present version of the slam-shut safety device 110 includes a housing 126 enclosing one or more springs 128, and the springs 128 are typically connected to a diaphragm 130. The diaphragm 130 is sensitive to pressure changes within the actuator 115 and moves within the actuator housing 126 in response to pressure changes. The diaphragm 130 is connected to a back plate 132, which moves longitudinally within the housing 126 in conjunction with the diaphragm 130. The back plate 132 interacts with a cam 134 to engage or release the reset pin 136. As discussed, the reset pin 136 is shiftable along the slam-shut axis A relative to the valve body 112 between a retracted or untripped position in which the valve disc 122 is spaced away from the valve seat 120 in an open position (FIG. 5) opening the flow orifice 121, and an extended or tripped position in which the valve disc 122 is seated against the valve seat 120 in a closed position (FIGS. 3 and 4) closing the flow orifice 121. The slam-shut portion 113 additionally includes a spring 137 or other suitable biasing mechanism near the end 136a of the reset pin 136 between the plug support and a spring seat 171 mounted to the slam-shut body 151 and adjacent to the valve disc 122. The spring 137 acts to bias the valve disc 122 toward the closed position.

Consequently, the reset pin 136, as mentioned, is shiftable along the slam-shut axis A between the untripped position and the tripped position when the actuator 115 senses either an overpressure condition or an underpressure condition. The actuator 115 causes the cam 134 to release the reset pin 136, such that the spring 137 causes the reset pin 136 and hence the valve disc 122 to slide or otherwise shift along the slam-shut axis A toward the valve seat 120, ultimately bringing the valve disc 122 into contact with the valve seat 120, thus closing the flow orifice 121 and shutting off fluid flow through the flow path 118. More specifically, and as shown in FIG. 4, the spring 137 causes the reset pin 136, the plug support 160, and the valve disc 122 toward the valve seat 120 and into the closed position. When occupying the closed position, a first sealing insert 191 carried in a front recessed surface 192 of the valve disc 122 sealingly engages an end 193 of the orifice 121 to provide a fluid-tight seal. Additionally, when in the closed position, a second sealing insert 195 carried on a back surface 194 of the valve disc 122 is sealingly engaged by a shoulder surface 197 of the plug support 160. The sealing engagement between the shoulder surface 197 and the second sealing insert 195 provides a fluid-tight seal that prevents fluid from leaking through the central opening 122a of the valve disc 122.

Throughout the operation of the device, when the valve disc 122 is in the open position, or another position displaced away from the closed position, fluid flows through the valve body 112 and fluid forces act on the valve disc 122. As discussed above, with respect to FIGS. 1 and 2, such fluid forces can be high enough to deform the structure supporting the valve disc 122 such as the reset pin 36, for example, of the conventional slam-shut safety device 10.

In contrast to the conventional slam-shut safety device 10, however, the version of the slam-shut safety device 110 disclosed with reference to FIGS. 3-5 includes a guide collar 162. As best shown in FIGS. 4 and 5, the guide collar 162 of the presently disclosed version of the slam-shut safety device 110 is connected to the valve disc 122 and includes a hollow cylindrical portion 174 extending at least partly over the reset pin 136. More specifically, in the present version, a first end 162a of the guide collar 162 is integrally connected to a perimeter portion 161 of the valve disc 122 such that the valve disc 122 and guide collar 162 of the present version are one-piece. In other versions, the guide collar 162 can be connected to the valve disc by a threaded connection, a weld joint, a friction fit joint, a pinned joint, an adhesive joint, a fastener connection, or any other suitable means.

With continued reference to FIGS. 4 and 5, the guide collar 162 is slidably disposed in the throat portion 153 of the slam shut body 151. More specifically, the slam-shut safety device 110 defines a guide bore 176, in which the guide collar 162 is slidably disposed. In the version of the slam-shut body 151 depicted in FIGS. 3-5, the slam shut body 151 can be formed or machined, for example, such that the guide bore 176 is formed directly in the slam shut body 151 such that the slam-shut body 151 defines an inner wall 176a of the guide bore 176. In other versions, however, a hollow sleeve can be inserted into the throat 153 of the slam-shut body 151 to define the guide bore 176 and inner wall 176a.

With the slam-shut safety device 110 constructed as described above, it can be seen that the guide collar 162 is shiftable along the slam-shut axis A with the valve disc 122 and reset pin 136. That is, the guide collar 162 is shiftable along the slam-shut axis A between a retracted position, as shown in FIG. 5, wherein the valve disc 122 is in the open position, and an extended position, as shown in FIG. 4, when the valve disc 122 is in the closed position. In the retracted position, a majority of the guide collar 162 is disposed inside of the guide bore 176. Additionally, with the present version, the valve disc 122 can include a radial shoulder portion 175 that is adapted to abut an end surface 157 of the throat portion 153 of the slam-shut body 151 when the guide collar 162 is in the retracted position. Thus, in this retracted position, any fluid forces generated in the valve body 112 and acting on the valve disc 122 are transferred to the guide collar 162 and ultimately borne by the throat portion 153 of the slam-shut body 151. Similarly, when displaced away from the retracted position toward the extended position, any fluid forces present in the valve body 112, for example prior to the valve disc 122 reaching the closed position, are transferred to the guide collar 162 and ultimately borne by the throat portion 153 of the slam-shut body 151. Thus, it can be appreciated that the guide collar 162 in combination with the other disclosed features effectively transfers fluid forces away from the reset pin 136, thereby maximizing the strength, integrity, and useful life of the slam-shut safety device 110.

To assist with facilitating displacement of the guide collar 162 relative to the guide bore 176, the version of the guide collar 162 depicted in FIGS. 3-5 can further include one or more alignment members 180 disposed between the guide collar 162 and an inner wall 176a of the guide bore 176. In the disclosed version of the slam-shut safety device 110, the inner wall 176a of the guide bore 176 is a smooth cylindrical surface and the alignment members 180 can include circumferential forms constructed of a resilient material (e.g., rubber, plastic, etc.), a graphite material, a metal material, or any other suitable material, carried within corresponding circumferential recesses 182 formed in an outer wall 184 of the guide collar 162. In other versions, the outer wall 184 of the guide collar 162 can include a smooth cylindrical surface while the one or more alignment members 180 are carried in circumferential recesses formed in the inner wall 176a of the guide bore 176. The alignment members 180 in some versions provide fluid tight seals between the guide collar 162 and the guide bore 176. In some versions, the alignment members 180 do not necessarily provide a fluid tight seal by provide alignment of the guide collar 162 relative to the slam-shut axis A. In such versions, resilient alignment members 180 can allow for some adjustment of the guide collar 162 relative to the slam-shut axis A when engaging the valve seat 120, for example. Additionally, the alignment members 180 can optionally include one or more axial openings providing fluid communication between an interior chamber 188 of the guide collar 162 and the fluid flow path 118 of the valve body 112. Such axial openings would enable fluid to vent into and out of the interior chamber 188 as the guide collar 162 displaces with the valve disc 122, thereby reducing the effect of any suction and/or compression that occurs in the chamber 188 during operation of the device 110. In other versions, such as that disclosed in FIGS. 4 and 5, fluid is allowed to vent into and out of the interior chamber 188 of the guide collar 162 through the central opening 122a of the valve disc 122. That is, as depicted in FIG. 5, in every position other than the closed position, the shoulder surface 197 of the plug support 160 can be spaced away from the second sealing insert 195 (see, FIG. 5), thereby opening a small gap between the nose portion 166 of the plug support 160 and the central opening 122a that defines a flow path for accommodating fluid flow into and out of the interior chamber 188.

From the foregoing, it should be appreciated that the disclosed configuration of a slam-shut safety device 110 advantageously minimizes the effects of fluid transfer on the operation and movement of the valve disc 122 and maintains the structural integrity of the reset pin 136 by deflecting forces to be borne by the slam shut body 151, which would otherwise be at least partly borne by the reset pin 136 itself. This construct therefore maintains the intended functionality and maximizes the useful life of the slam-shut safety device 110. Therefore, it can be understood that any version of the guide collar described herein being guided by and bearing against the guide bore to transfer the forces in the described manner can be referred to as a means coupled to the valve disc for protecting the reset pin against detrimental effects of fluid forces generated in the valve body adjacent to the valve disc.

While certain representative versions of slam-shut devices and details have been described herein for purposes of illustrating the invention, it will be apparent to those skilled in the art that various changes in the devices disclosed may be made without departing from the spirit and scope of the invention, which is defined by the following claims and is not limited in any manner by the foregoing description.

What is claimed:

1. A slam-shut safety device, comprising:
   a valve body having an inlet, an outlet, and defining a flow path extending between the inlet and the outlet, the valve body including a valve seat surrounding an orifice disposed between the inlet and the outlet;
   a valve disc disposed within the valve body and shiftable along a slam-shut axis between an open first position in which the valve disc is spaced away from the valve seat, and a closed second position in which the valve disc is seated against the valve seat;
   a reset pin operatively coupled to the valve disc and shiftable along the slam-shut axis relative to the valve body between an untripped position placing the valve disc in the open first position and a tripped position placing the valve disc in the closed second position, the reset pin arranged to respond to an actuator to shift the reset pin from the untripped position toward the tripped position; and
   a guide collar connected to the valve disc and including a hollow cylindrical portion extending away from the valve disc at least partly over the reset pin, the guide collar slidably disposed in a guide bore of a slam shut body that is connected to the valve body and supporting the reset pin, thereby providing added structural integrity to the rest pin and valve disc; and
   the valve disc including a radial shoulder portion that abuts an end surface of a throat of the slam shut body when the valve disk is in the open first position.

2. The device of claim 1, wherein the guide collar is shiftable along the slam-shut axis between a retracted position, wherein a majority of the guide collar is disposed inside of the guide bore when the valve disc is in the open position, and an extended position, wherein the majority of the guide collar is disposed outside of the guide bore when the valve disc is in the closed position.

3. The device of claim 1, further comprising one or more alignment members disposed between the guide collar and an inner wall of the guide bore.

4. The device of claim 3, wherein the one or more alignment members include one or more circumferential alignment members carried within circumferential recesses formed in an outer wall of the guide collar.

5. The device of claim 1, wherein the guide collar extends from a perimeter portion of the valve disc.

6. The device of claim 1, further comprising a plug support disposed between an end of the reset pin and the valve disc.

7. The device of claim 6, wherein the plug support includes a nose portion extending through an opening in the valve disc.

8. The device of claim 1, further comprising a spring disposed around the reset pin and biasing the valve disc toward the closed position.

9. The device of claim 1, wherein the valve disc and the guide collar are one-piece.

10. The device of claim 1, wherein the guide collar is connected to the valve disc by a fixation device including one or more of the following: a threaded connection, a weld joint, a friction fit joint, a pinned joint, an adhesive joint, a fastener connection.

11. A slam-shut safety device, comprising:
    a slam shut body including a throat portion adapted to be connected to a valve body;
    a reset pin supported by the slam-shut body and extending out of the throat portion, the reset pin being shiftable along a slam-shut axis between an untripped position retracted into the slam-shut body and a tripped position extended out of the slam-shut body relative to the retracted position, the reset pin arranged to respond to an actuator to shift the reset pin from the untripped position toward the tripped position;

a valve disc operatively coupled to an end of the reset pin outside of the throat of the slam-shut body, the valve disc adapted to be disposed within the valve body when the slam-shut body is connected to the valve body, the valve disc shiftable along the slam-shut axis between an open first position when the reset pin is in the untripped position, and a closed second position when the reset pin is in the tripped position, the valve disc including a radial shoulder portion that abuts an end surface of the throat of the slam-shut body when the valve disk is in the open first position; and a guide collar connected to the valve disc and including a hollow cylindrical portion extending away from the valve disc at least partly over the reset pin, the guide collar slidably disposed in a guide bore of the slam shut body, the guide collar shiftable along the slam-shut axis between a retracted position, wherein a majority of the guide collar is disposed inside of the guide bore when the valve disc is in the open position, and an extended position, wherein the majority of the guide collar is disposed outside of the guide bore when the valve disc is in the closed position.

12. The device of claim 11, further comprising one or more alignment members disposed between the guide collar and the inner wall of the guide bore.

13. The device of claim 12, wherein the one or more alignment members include one or more circumferential alignment members carried within circumferential recesses formed in an outer wall of the guide collar.

14. The device of claim 11, wherein the guide collar extends from a perimeter portion of the valve disc.

15. The device of claim 11, further comprising a plug support disposed between an end of the reset pin and the valve disc.

16. The device of claim 15, wherein the plug support includes a nose portion extending through an opening in the valve disc.

17. The device of claim 11, further comprising a spring disposed around the reset pin and biasing the valve disc toward the closed position.

18. The device of claim 11, wherein the valve disc and the guide collar are one-piece.

19. The device of claim 11, wherein the guide collar is connected to the valve disc by a fixation device including one or more of the following: a threaded connection, a weld joint, a friction fit joint, a pinned joint, an adhesive joint, a fastener connection.

20. A slam-shut safety device, comprising:

a valve body having an inlet, an outlet, and defining a flow path extending between the inlet and the outlet, the valve body including a valve seat surrounding an orifice disposed between the inlet and the outlet;

a valve disc disposed within the valve body and shiftable along a slam-shut axis between an open first position in which the valve disc is spaced away from the valve seat, and a closed second position in which the valve disc is seated against the valve seat;

a reset pin operatively coupled to the valve disc and shiftable along the slam-shut axis relative to the valve body between an untripped position placing the valve disc in the open first position and a tripped position placing the valve disc in the closed second position, the reset pin arranged to respond to an actuator to shift the reset pin from the untripped position toward the tripped position; and a first means coupled to the valve disc for protecting the reset pin against detrimental effects of fluid forces generated in the valve body adjacent to the valve disc when the valve disc is not in the open first position; and the valve disc comprising a second means for protecting the reset pin and the first means against detrimental effects of fluid forces generated in the valve body adjacent to the valve disc when the valve disc is in the open first position.

* * * * *